United States Patent
Wang

(10) Patent No.: US 10,747,483 B2
(45) Date of Patent: Aug. 18, 2020

(54) IMAGE FORMING APPARATUS THAT UPDATES FIRMWARE

(71) Applicant: CANON KABUSHIKI KAISHA, Tokyo (JP)

(72) Inventor: Xiaoli Wang, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/513,563

(22) Filed: Jul. 16, 2019

(65) Prior Publication Data

US 2020/0042257 A1 Feb. 6, 2020

(30) Foreign Application Priority Data

Jul. 31, 2018 (JP) .................................. 2018-143943

(51) Int. Cl.
*G06F 3/12* (2006.01)
*G06F 8/65* (2018.01)

(52) U.S. Cl.
CPC ............ *G06F 3/123* (2013.01); *G06F 3/1204* (2013.01); *G06F 8/65* (2013.01)

(58) Field of Classification Search
CPC ........... G06F 3/123; G06F 3/1204; G06F 8/65
See application file for complete search history.

(56) References Cited

U.S. PATENT DOCUMENTS

| 2004/0068548 | A1* | 4/2004 | Sugita | G06F 8/65 709/208 |
| 2007/0050533 | A1* | 3/2007 | Suzuki | G06F 9/4403 711/102 |
| 2013/0132935 | A1* | 5/2013 | Kuroki | G06F 8/654 717/168 |
| 2013/0332914 | A1* | 12/2013 | Goda | G06F 8/65 717/168 |
| 2014/0160507 | A1* | 6/2014 | Utsumi | H04N 1/00904 358/1.13 |
| 2016/0124740 | A1* | 5/2016 | Choi | G06F 8/654 717/168 |
| 2018/0267715 | A1* | 9/2018 | Matsudaira | G06F 3/0611 |

FOREIGN PATENT DOCUMENTS

JP 2009-5019 A 1/2009

* cited by examiner

*Primary Examiner* — Moustapha Diaby
(74) *Attorney, Agent, or Firm* — Canon U.S.A., Inc. I.P. Division

(57) ABSTRACT

In an image forming apparatus that includes a first system including a first CPU, and a second system including a second CPU and a memory configured to store firmware to be executed by the second CPU, the second CPU makes, on a writing device that writes received data to a device of the second system, a setting to enable the writing device to directly write update data for the firmware received from the first system, to the memory of the second system.

12 Claims, 8 Drawing Sheets

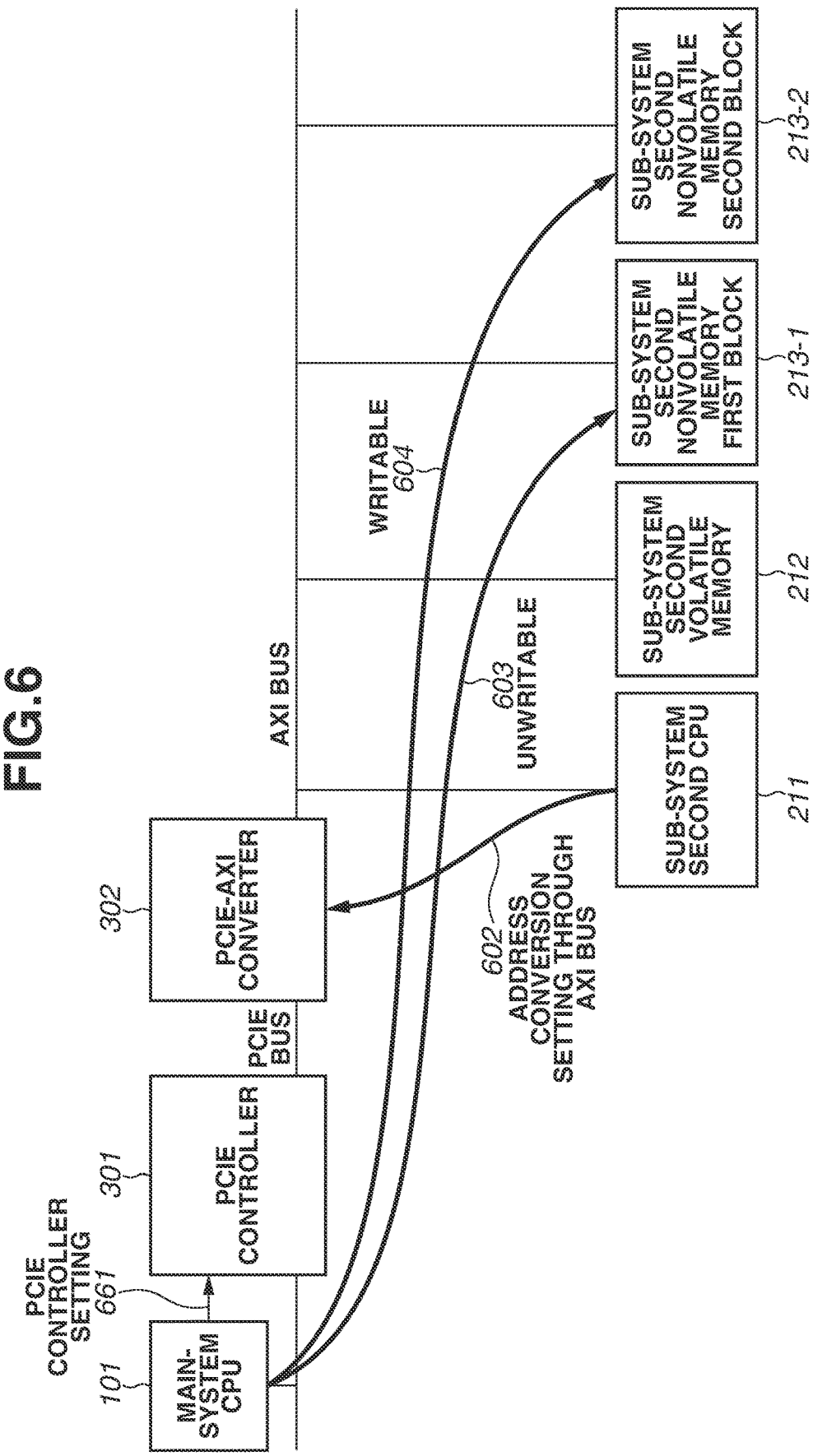

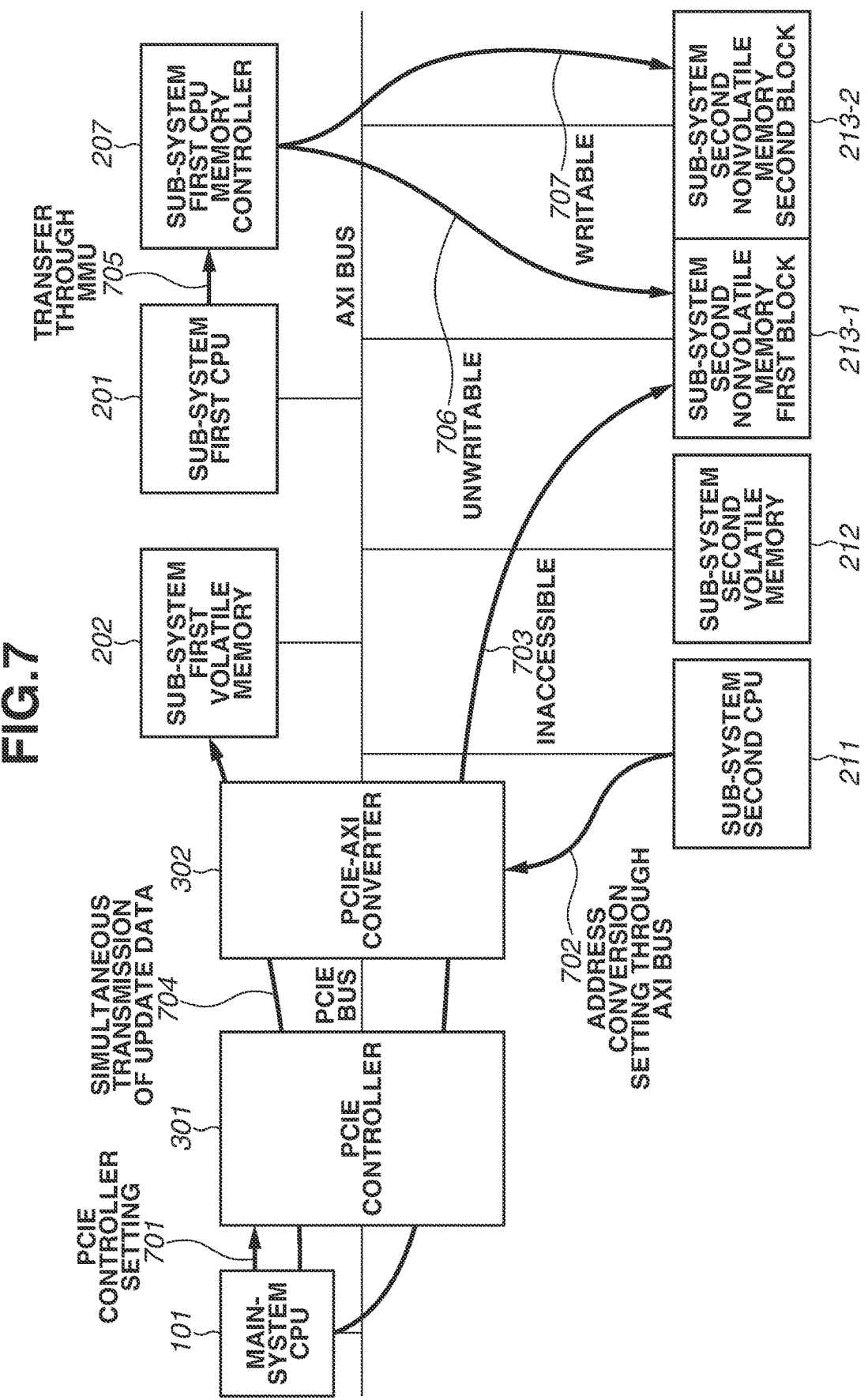

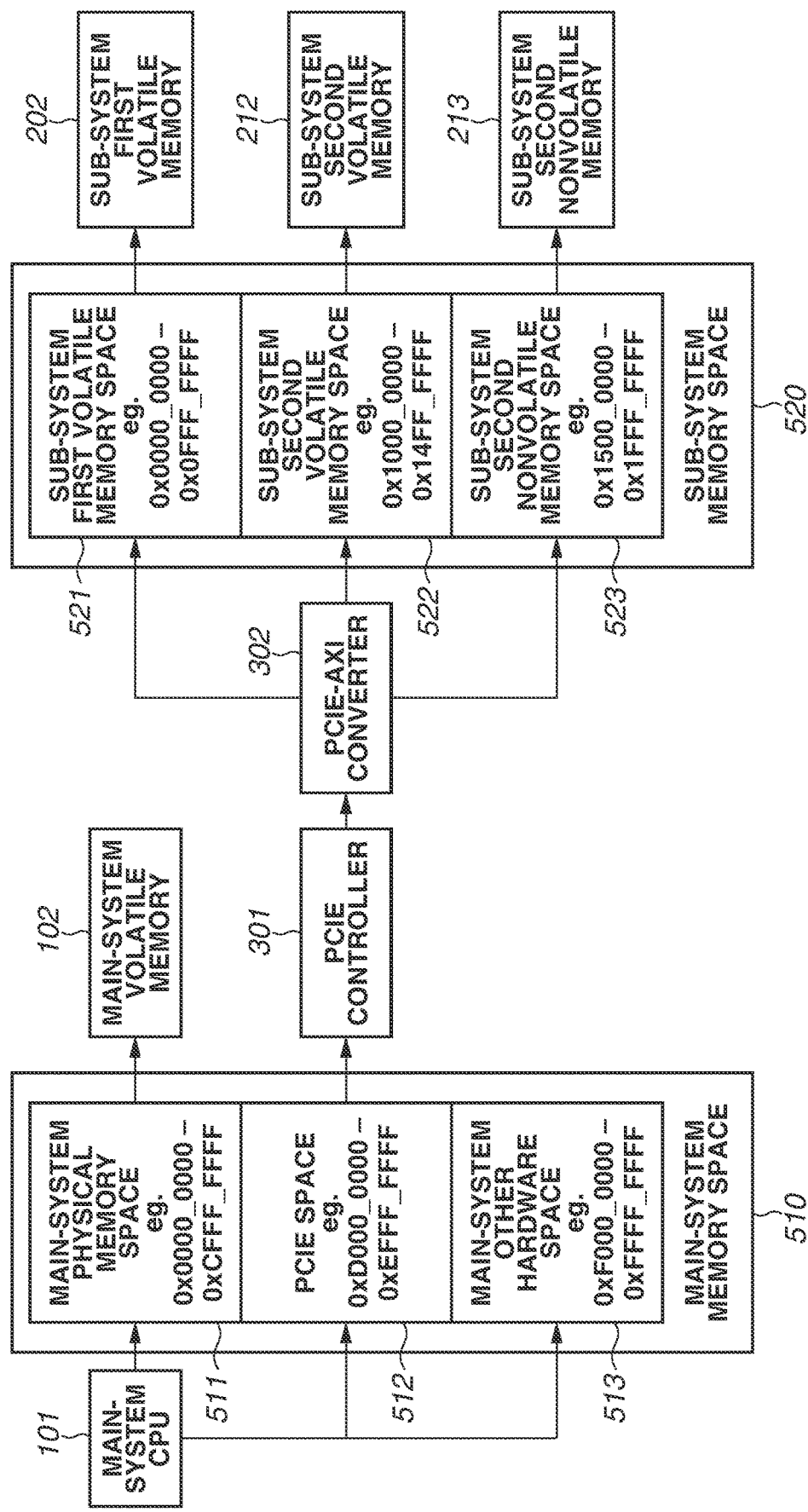

IMAGE FORMING APPARATUS THAT UPDATES FIRMWARE

BACKGROUND

Field

The present disclosure relates to a technology to update firmware.

Description of the Related Art

An information apparatus is configured to add a new function to the apparatus or eliminate a defect of a program by updating firmware. Japanese Patent Application Laid-Open No. 2009-5019 discusses an image forming apparatus that includes a main system and a sub-system. The main system includes a universal serial bus (USB) controller and a central processing unit (CPU). The sub-system includes an image processor, a device controller controlling a printer engine, and a CPU. Japanese Patent Application Laid-Open No. 2009-5019 discusses processing to update a start-up program of the CPU in the sub-system in such an image forming apparatus including the main system and the sub-system. In the image forming apparatus, the CPU in the main system acquires update data for the start-up program of the CPU in the sub-system from a USB memory, etc. to develop the update data in a random access memory (RAM) in the main system. Further, the CPU in the sub-system copies the update data developed in the RAM in the main system to a RAM in the sub-system, and overwrites (updates) the copied update data in a boot read-only memory (ROM) in the sub-system.

In the above-described image forming apparatus, the main system and the sub-system have roles different from each other. Therefore, the CPU and the RAM in the sub-system may be lower in processing capability or in storage capacity than the CPU and the RAM in the main system. When the CPU and the RAM low in processing capability and storage capacity perform firmware update, high-speed update may not be performed because of the low processing capability and the low storage capacity.

SUMMARY

According to various embodiments of the present disclosure, an image forming apparatus includes a first system including a first CPU, and a second system including a second CPU. In the image forming apparatus, the first system includes a transfer device configured to transfer data from the first system to the second system, and the second system includes a writing device configured to write the received data to a device of the second system and a nonvolatile memory configured to store firmware to be executed by the second CPU. The second CPU makes, on the writing device, a setting to enable the writing device to write the data received from the transfer device, to the nonvolatile memory of the second system, and the writing device subjected to the setting by the second CPU receives update data for the firmware to be executed by the second CPU, from the transfer device, and writes the received update data to the nonvolatile memory.

Further features \will become apparent from the following description of exemplary embodiments with reference to the attached drawings.

BRIEF DESCRIPTION OF THE DRAWINGS

FIG. 6 is a diagram illustrating a method of updating an operation program of a sub-system second CPU according to a second exemplary embodiment.

FIG. 7 is a diagram illustrating a method of updating an operation program of a sub-system second CPU according to a third exemplary embodiment.

FIG. 8 is a diagram illustrating a main-system address space and a sub-system address space.

DESCRIPTION OF THE EMBODIMENTS

Some exemplary embodiments of the present disclosure are described with reference to drawings.

<Description of System Configuration>

Some exemplary embodiments are described below with reference to drawings. The following exemplary embodiments do not limit the scope of the present invention defined in claims, and all of combinations of features described in the exemplary embodiments are not necessarily essential as the solving means of all embodiments of the present disclosure.

A first exemplary embodiment is described below. An image forming apparatus as an example of an information processing apparatus according to the present exemplary embodiment is described.

Figure 1:
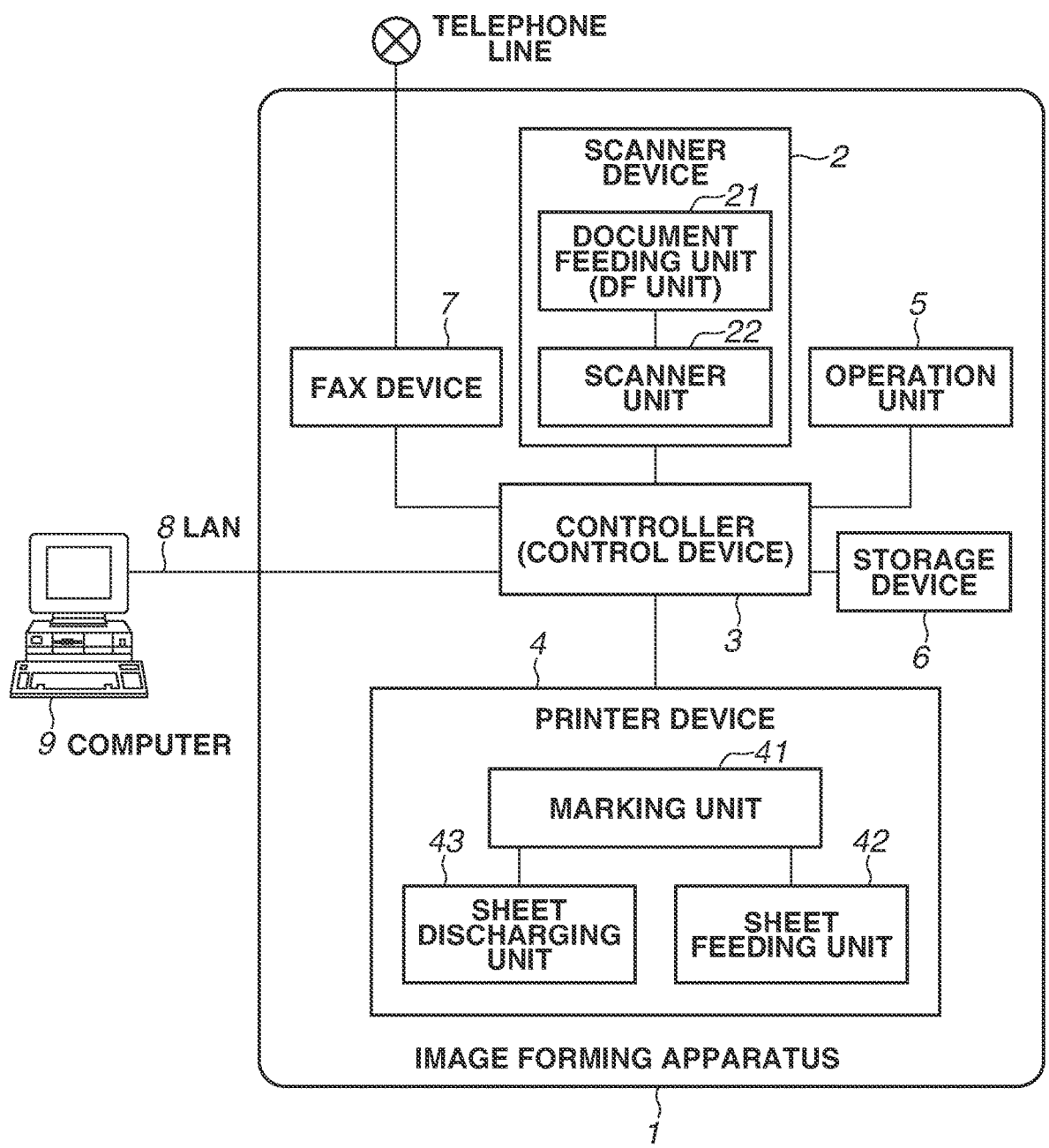
FIG. 1 is a block diagram illustrating an image forming apparatus.

FIG. 1 is a block diagram illustrating a system. An image forming apparatus 1 includes a controller (control device) 3, a scanner device 2, a printer device 4, a storage device 6, an operation unit 5, and a facsimile (FAX) device 7.

The scanner device 2 includes a document feeding unit 21 that automatically successively exchanges documents, and a scanner unit 22 that optically scans a document and converts contents of the scanned document into a digital image. The scanner device 2 transmits data of the acquired digital image to the controller 3.

The printer device 4 includes a sheet feeding unit 42 that successively feeds a sheet one by one from a bundle of sheets internally stored, a marking unit 41 that prints image data on the fed sheet, and a sheet discharging unit 43 that discharges the printed sheet. The printer device 4 prints on a sheet such as paper the digital image obtained by the scanner device 2 or a digital image of print data that is received from an external computer 9 through a local area network (LAN) 8.

The operation unit 5 is a user interface that includes a touch screen and hardware keys. The touch screen displays information such as device setting to a user and receives touch operation by the user. The hardware keys include a start key that receives an instruction to start copying and an instruction to start scanning, from the user. The operation unit 5 notifies the controller 3 of the contents given to the operation unit 5 by the user.

The storage device 6 stores the digital image, a control program, etc. In the present exemplary embodiment, the storage device 6 is any of a plurality of storage devices including a hard disk drive (HDD) and a solid-state drive (SSD). The FAX device 7 is connected to a telephone line, and transmits the digital image to outside. The controller 3 is connected to these devices, and can execute jobs of printing, scanning, data transmission, etc. by instructing each of the modules (devices and units). Further, the controller 3 receives update data for the firmware from the outside, and updates the firmware with the received update data.

The image forming apparatus 1 can execute various jobs. Examples of the jobs are described below.

Copy function: an image read from the scanner device 2 is stored in the storage device 6 and is printed by the printer device 4 at the same time.

Image transmission function: the image read from the scanner device 2 is transmitted to the computer 9 through the LAN 8.

Image saving function: the image read from the scanner device 2 is stored in the storage device 6, and image transmission and image printing are performed as necessary.

Image printing function: for example, a page description language transmitted from the computer 9 is analyzed and printing is performed by the printer device 4.

Figure 2:
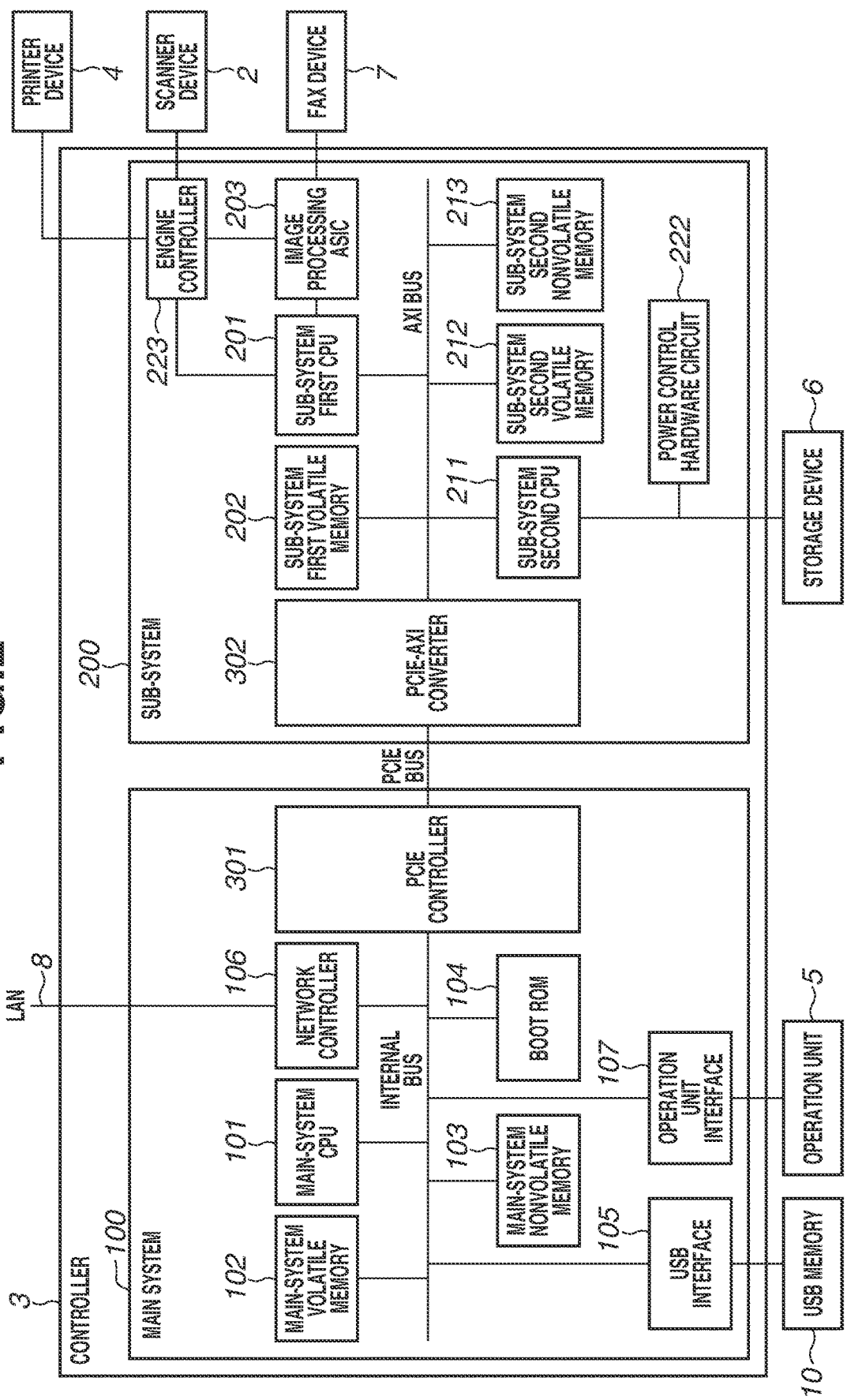
FIG. 2 is a block diagram illustrating an inside of a controller of the image forming apparatus.

FIG. 2 is a block diagram illustrating the controller 3.

The controller 3 includes a main system 100 and a sub-system 200 that is connected to the main system 100 through Peripheral Component Interconnect Express (PCIe) bus. As described below, a physical address space of the main system 100 is different from a physical address space of the sub-system 200, and the physical address spaces are partially mapped to each other by a PCIe-Advanced eXtensible Interface (AXI) converter 302. For example, an address designated by a main-system CPU 101 to access a device in the sub-system 200 and a physical address of the device in the sub-system are mapped to each other. A setting of the mapping is made by a sub-system second CPU 211 in the sub-system 200, based on a firmware program that is stored in a sub-system second nonvolatile memory 213.

In the present exemplary embodiment described below, the sub-system second CPU 211 makes the setting of the mapping on the PCIe-AXI converter 302. Further, the PCIe-AXI converter 302 subjected to the setting of the mapping updates at least a part of the firmware to be executed by the sub-system second CPU 211 which makes the setting of the mapping, in response to an instruction from the main-system CPU 101.

The main system 100 is a so-called general-purpose CPU system. The main system 100 includes hardware illustrated in FIG. 2, and each hardware is connected to an internal bus.

The main-system CPU 101 (hereinafter, referred to as CPU 101) is a processor controlling the entire controller 3. A boot read-only memory (ROM) 104 stores a program to be executed by the CPU 101 immediately after reset of the CPU 101 is released (i.e., boot program of CPU 101). The boot program instructs a storage location of a program to be executed next by the CPU 101. In the present exemplary embodiment, the location is a main-system nonvolatile memory 103 (hereinafter, referred to as nonvolatile memory 103).

The nonvolatile memory 103 stores an operation program to be executed by the CPU 101 after the boot program. The operation program includes an operating system (OS) of the main system 100. The operation program further includes a program to perform initial setting (initialization) of a network controller 106 and a universal serial bus (USB) interface 105. The operation program further includes a program to perform initial setting of a PCIe controller 301. The PCIe controller 301 functions as a transfer device that transfers data designated by the CPU 101 and an address in which the data is written, from the main system 100 to the sub-system 200. Further, the PCIe controller 301 also functions as a device that transfers data from the sub-system 200 to the main system 100.

The operation program stored in the nonvolatile memory 103 also includes an application program of the main system 100 to be operated on the OS. The addresses of the respective devices connected to an internal bus in the main system 100 and an AXI bus in the sub-system 200 are previously described in the application program. The CPU 101 accesses each of the devices with use of the corresponding address based on the application program. For example, when the CPU 101 issues an instruction to write data in the address indicating the subsystem second nonvolatile memory 213, the PCIe controller 301 notifies the PCIe-AXI converter 302 of the instruction to write data in the address. Hereinafter, the sub-system second nonvolatile memory 213 is referred to as the nonvolatile memory 213, and the PCIe-AXI converter 302 is referred to as the converter 302. The nonvolatile memory 213 is a flash memory.

The converter 302 can function as a bus master of the AXI bus in the sub-system 200, and has a conversion function to convert bus access in the main system 100 into bus access in the sub-system 200. The conversion function converts, for example, an address (address in which data is written) notified from the CPU 101 through the PCIe bus into an address on the AXI bus in the sub-system 200 (i.e., address effective on sub-system 200). Further, the conversion function converts, for example, a data format of data transmitted through the PCIe bus into a data format of data to be transmitted through the AXI bus. The converter 302 as the bus master of the AXI bus writes data received from the main system 100 in an address on the AXI bus (nonvolatile memory 213 in this example). In other words, the converter 302 functions as a writing device that writes the data received from the main system 100 in the device in the sub-system 200. In the data writing, the sub-system second CPU 211 (hereinafter, referred to as CPU 211) is not used because the converter 302 functions as the bus master. In addition, the converter 302 as the bus master can similarly write data from the CPU 101 to a sub-system first volatile memory 202 (hereinafter, referred to as volatile memory 202). In the data writing, a sub-system first CPU 201 (hereinafter, referred to as CPU 201) is not used. The volatile memory 202 is a volatile random access memory (RAM) used as a main memory (work memory) of the CPU 201.

A main-system volatile memory 102 (hereinafter, referred to as volatile memory 102) is a volatile RAM used as a main memory (work memory) of the CPU 101. The CPU 101 develops the above-described operation program stored in the nonvolatile memory 103 to the volatile memory 102, and executes the developed operation program. The USB interface 105 is an interface to connect an external storage device such as a USB memory 10 to the main system 100. The network controller 106 is an interface to perform communication with the computer 9 outside the image forming apparatus 1 through a LAN cable. An operation unit interface 107 is an interface to connect the operation unit 5 to the main system 100.

The sub-system 200 is a CPU system controlling an image processing function. The sub-system 200 includes hardware illustrated in FIG. 2.

The CPU 211 is a processor that executes a program stored in an address 0 in the nonvolatile memory 213 when reset is released after power is turned on. The program is a boot program of the CPU 211. Further, the program indicates a location where an operation program (firmware program of CPU 211) to be executed by the CPU 211 subsequent to the boot program is stored. In the present exemplary embodiment, the location is a specific address in the nonvolatile memory 213. The operation program is developed to a sub-system second volatile memory 212 (hereinafter, referred to as volatile memory 212) by the CPU 211 when executed. The volatile memory 212 is a volatile RAM used as a main memory (work memory) of the CPU 211. The operation program is also a control program for the storage device 6 and a power control hardware circuit 222. The operation program further makes an initial setting of the converter 302. In the initial setting, correspondence relationship (mapping) between an address managed by the main system 100 and a physical address on the AXI bus is set. In other words, when the initial setting is made, the hardware devices connected to the AXI bus of the sub-system 200 are allocated to an address space of the main system 100 (CPU 101). As a result, as described above, the CPU 101 in the main system 100 can access the corresponding hardware device connected to the AXI bus of the sub-system 200 by issuing an access order to the own memory address space. In the present exemplary embodiment, the boot program of the CPU 211 stored in the nonvolatile memory 213 of the sub-system 200 is updated with update data with use of the above mechanism. The update data is acquired from outside through the LAN 8 and the USB interface 105.

The sub-system 200 further includes the CPU 201. The CPU 201 is a processor that executes a boot program of the CPU 201 written in the volatile memory 202. The boot program of the CPU 201 is written from the main system 100 in the volatile memory 202 in response to an instruction from the CPU 101. The CPU 201 executes the boot program to control the printer device 4, the scanner device 2, and the FAX device 7 via an image processing application specific integrated circuit (ASIC) (image processing device) 203 and an engine controller 223.

For example, when a user instructs image copy from the operation unit 5, the CPU 101 causes the CPU 201 to perform control relating to the image copy. More specifically, the CPU 101 transmits an instruction to read an image to the scanner device 2 through the CPU 201. The scanner device 2 then optically scans a paper document and converts contents of the paper document into digital image data, and provides the digital image data to the image processing ASIC 203 through the engine controller 223. The image processing ASIC 203 performs direct memory access (DMA) transfer of the digital image data to the volatile memory 202 through the CPU 201, and temporarily stores the digital image data. Next, when the CPU 101 confirms that a predetermined amount or all of the digital image data has been stored in the volatile memory 202, the CPU 101 instructs the printer device 4 to output an image through the CPU 201. At this time, the CPU 201 notifies the image processing ASIC 203 of the storage location (storage address) of the image data in the volatile memory 202. The engine controller 223 then transmits the image data in the memory 202 to the printer device 4 based on a synchronization signal from the printer device 4. Thus, the printer device 4 prints the digital image data.

FIG. 2 is a simplified block diagram. For example, each of the CPU 101, the CPU 201, etc. includes a large number of CPU peripheral hardware such as a chip set, a bus bridge, and a clock generator; however, each of the CPU 101, the CPU 201, etc. is simplified because detailed illustration of the hardware is unnecessary in terms of granularity of description. The block configuration does not limit the scope of the present disclosure.

Next, a start-up sequence by the controller 3 is described with reference to FIG. 3. The start-up sequence is roughly divided into start-up of the main system 100 and start-up of the sub-system 200. In the following, when a power switch of the image forming apparatus 1 is turned on by the user, a power-on reset circuit asserts an internal reset signal to reset the CPU 101 and the CPU 211. When the power-on reset circuit detects that a power voltage of the image forming apparatus 1 has risen to a reference voltage, the power-on reset circuit deasserts (negates) the internal reset signal to release reset of the CPU 101 and the CPU 211.

<Start-Up of Main System 100>

In step S311, the CPU 101 released from reset starts up the main system 100. More specifically, the CPU 101 executes the boot program in the boot ROM 104, and the CPU 101 reads a boot loader stored in the nonvolatile memory 103 into the volatile memory 102 and executes the boot loader based on the boot program. The CPU 101 then reads the OS from the nonvolatile memory 103 into the volatile memory 102 and executes the OS based on the boot loader. In the process, the CPU 101 initializes the devices such as the PCIe controller 301, the USB interface 105, the network controller 106, and the operation unit interface 107. As a result, the CPU 101 becomes accessible to each of the devices. For example, the CPU 101 can access each of the devices with reference to the PCIe bus beyond the PCIe controller 301. Thereafter, the CPU 101 executes a job processing application read by the OS from the nonvolatile memory 103 into the volatile memory 102. The main system 100 is started up in the above-described manner.

<Start-Up of Sub-System 200>

The CPU 211 released from reset performs steps S321 to S324 described below in parallel with the start-up processing of the main system 100 in step S311.

In step S321, the CPU 211 executes the program stored in the nonvolatile memory 213 from the address 0. The CPU 211 then reads (loads) an operation program (also referred to as firmware program) stored in an address designated by the program, from the nonvolatile memory 213 into the volatile memory 212. The operation program carries out processing in steps S322 to S324 described below.

In step S322, the CPU 211 sets to the converter 302 an address conversion rule to convert the PCIe bus access into bus access in the sub-system 200. This enables the CPU 101 of the main system 100 to refer to the device (e.g., volatile memory 202 and nonvolatile memory 213) connected to the AXI bus of the sub-system 200 as if the device is mapped in the own memory space (in CPU 101). A method for the CPU 101 to refer to the address space in the sub-system 200 through the PCIe controller 301 and the converter 302 is described with reference to FIG. 8.

FIG. 8 illustrates an address space that can be referred to by the CPU 101. The CPU 101 designates an address in the address space, thereby accessing the device corresponding to the address.

The address space (main system memory space 510) that can be referred to by the CPU 101 includes a main-system physical memory space 511, a PCIe space 512, and a main-system other hardware space 513.

The volatile memory 102 is mapped to the main system physical memory space 511, and the CPU 101 can access the volatile memory 102 by accessing the corresponding address. In the present exemplary embodiment, the volatile memory 102 is disposed in addresses 0X0000_0000 to 0xCFFF_FFFF.

The device on the PCI bus via the PCIe controller 301 is mapped in the PCIe space 512, and the CPU 101 can access the device on the PCIe bus by accessing the corresponding address. In the present exemplary embodiment, the device on the PCIe bus is disposed in an address 0xD000_0000 to 0xEFFF_FFFF. The access to the address corresponds to access to the PCIe controller 301. The PCIe controller 301 accessed by the CPU 101 communicates with the device corresponding to the address which the CPU 101 accesses (i.e., hardware connected to PCIe bus) with use of a protocol conforming to PCIe.

Since the converter 302 is connected to the PCIe bus in this case, the converter 302 converts the address to be accessed by the CPU 101 into an address on the AXI bus. In other words, the converter 302 converts the access to the PCIe space into access to the sub-system memory space 520 on the AXI bus. Further, the converter 302 as the bus master accesses the address on the AXI bus to achieve the access to the device on the AXI bus from the CPU 101.

In the present exemplary embodiment, when the CPU 101 accesses the PCIe space 512 (0xD000_0000 to 0xDFFF_FFFF), the CPU 101 can access a sub-system first volatile memory space 521 (0x0000_0000 to 0xEFFF_FFFF). As a result, the CPU 101 accesses the sub-system first volatile memory 202.

When the CPU 101 accesses the PCIe space 512 (0xE000_0000 to 0xE4FF_FFFF), the CPU 101 can access a sub-system second volatile memory space 522 (0x1000_0000 to 0x14FF_FFFF). As a result, the CPU 101 accesses the sub-system second volatile memory 212.

Further, when the CPU 101 accesses the PCIe space 512 (0xE500_0000 to 0xEFFF_FFFF), the CPU 101 can access a sub-system second nonvolatile memory space 523 (0x1500_0000 to 0x1FFF_FFFF). As a result, the CPU 101 accesses the sub-system second nonvolatile memory 213.

The access to the sub-system memory space 520 is performed by the converter 302 acting as the bus master of the AXI bus. Therefore, the access can be performed without using the CPU 201 and the CPU 211 of the subsystem 200.

The access to the USB interface 105, the network controller 106, the operation unit interface 107, and the storage device 6 is performed through access to the main-system other hardware space 513. The access to the storage device 6 from the CPU 101 is performed through the PCIe controller 301 and the converter 302, though illustration is omitted in FIG. 8. Further, the access to the storage device 6 is performed under control of the CPU 211 described below.

Referring back to FIG. 3, in step S323, the CPU 211 starts control of the storage device 6. When the CPU 211 receives a data writing instruction or a data reading instruction from the CPU 101 through the PCIe bus in the control, the CPU 211 performs data writing control or data reading control on the storage device 6. When the CPU 211 receives a data writing instruction or a data reading instruction from the CPU 201, the CPU 211 performs data writing control or data reading control on the storage device 6. The CPU 211 executes a method for the data writing control or the data reading control based on the operation program. The operation program is different depending on a type of the storage device 6. When the storage device 6 is an HDD, the operation program for HDD is executed. When the storage device 6 is an SSD, the operation program for SSD is executed. The operation program is stored corresponding to the type of the storage device 6 in the nonvolatile memory 213 to save capacity of the nonvolatile memory 213.

In step S324, the CPU 211 starts control of the power control hardware circuit 222. In this control, the CPU 211 performs power control (and clock supply control) on each piece of hardware in the sub-system 200.

<Transfer of Sub-System Boot Program from Main System 100 to Sub-System 200>

In step S314, the CPU 101 transfers a sub-system boot program from the nonvolatile memory 103 to the volatile memory 202 through the PCIe controller 301 and the converter 302. The sub-system boot program is a boot program of the CPU 201, and corresponds to a system boot image of the sub-system 200.

Thereafter, in step S315, the CPU 101 releases reset of the CPU 201.

In step S331, the CPU 201 released from reset executes the boot program stored in the volatile memory 202 to start up the sub-system 200. As a result, the main system 100 and the sub-system 200 can process a job while cooperating with each other in communication.

<Control after Start-Up of Main System 100 and Sub-System 200>

In step S340, the CPU 101, the CPU 201, and the CPU 221 process a job while communicating with one another. More specifically, when a job appears, the CPU 101 controls the image processing ASIC 203 and the engine controller 223, and the printer device 4, the scanner device 2, and the FAX device 7, which lie ahead, to perform printing, scanning, and FAX reception/transmission while communicating with the CPU 201.

For example, when the CPU 101 receives print data through the network controller 106, the CPU 101 generates a print job. The CPU 101 then transmits the print data to the sub-system 200. The CPU 201 causes the image processing ASIC 203 to process the received print data. The image data processed by the image processing ASIC 203 is stored in the volatile memory 202. In the processing, the CPU 201 controls the power control hardware circuit 222 to supply power to the image processing ASIC 203. Further, the CPU 201 instructs the CPU 211 to store the image data processed by the image processing ASIC 203 in the storage device 6 from the volatile memory 202. The CPU 211 then controls the storage device 6 to store the image data that has been stored in the volatile memory 202. Further, when the CPU 201 detects that the printer device 4 is ready for printing via the engine controller 223, the CPU 201 instructs the CPU 211 to read the image data from the storage device 6. The CPU 211 then controls the storage device 6 to read the image data, and transmits the image data to the CPU 201. The CPU 201 causes the printer device 4 to print the received image data via the engine controller 223.

In the present exemplary embodiment, the CPU 101 of the main system 100 transmits the boot program of the CPU 201 of the sub-system 200 to the volatile memory 202 of the sub-system 200 through the PCIe bus in the above-described manner. Therefore, it is sufficient to perform the following processing in updating the boot program of the CPU 201 of the sub-system 200. The CPU 101 of the main system 100 acquires the update data for the boot program from the LAN 8 or the USB memory 10, and updates the boot program of the CPU 201 in the nonvolatile memory 103 with the update data.

However, since the operation program (firmware program) to be executed by the CPU 211 is stored in the nonvolatile memory 213, it is not sufficient to acquire the update data from the LAN 8 or the USB memory 10 and to store the update data in the nonvolatile memory 103. It is necessary to store the update data for the firmware stored in the nonvolatile memory 103, in the nonvolatile memory 213 through the PCIe bus and the converter 302.

As described above, the firmware of the CPU 211 includes the operation programs to perform initial setting of the converter 302, control of the storage device 6, and power control. Therefore, it is necessary to update the operation programs based on change of the control program caused by replacement of the storage device 6 from the HDD to the SSD and change of power control specification (e.g., change of power input order at the time of start-up).

Figure 4:
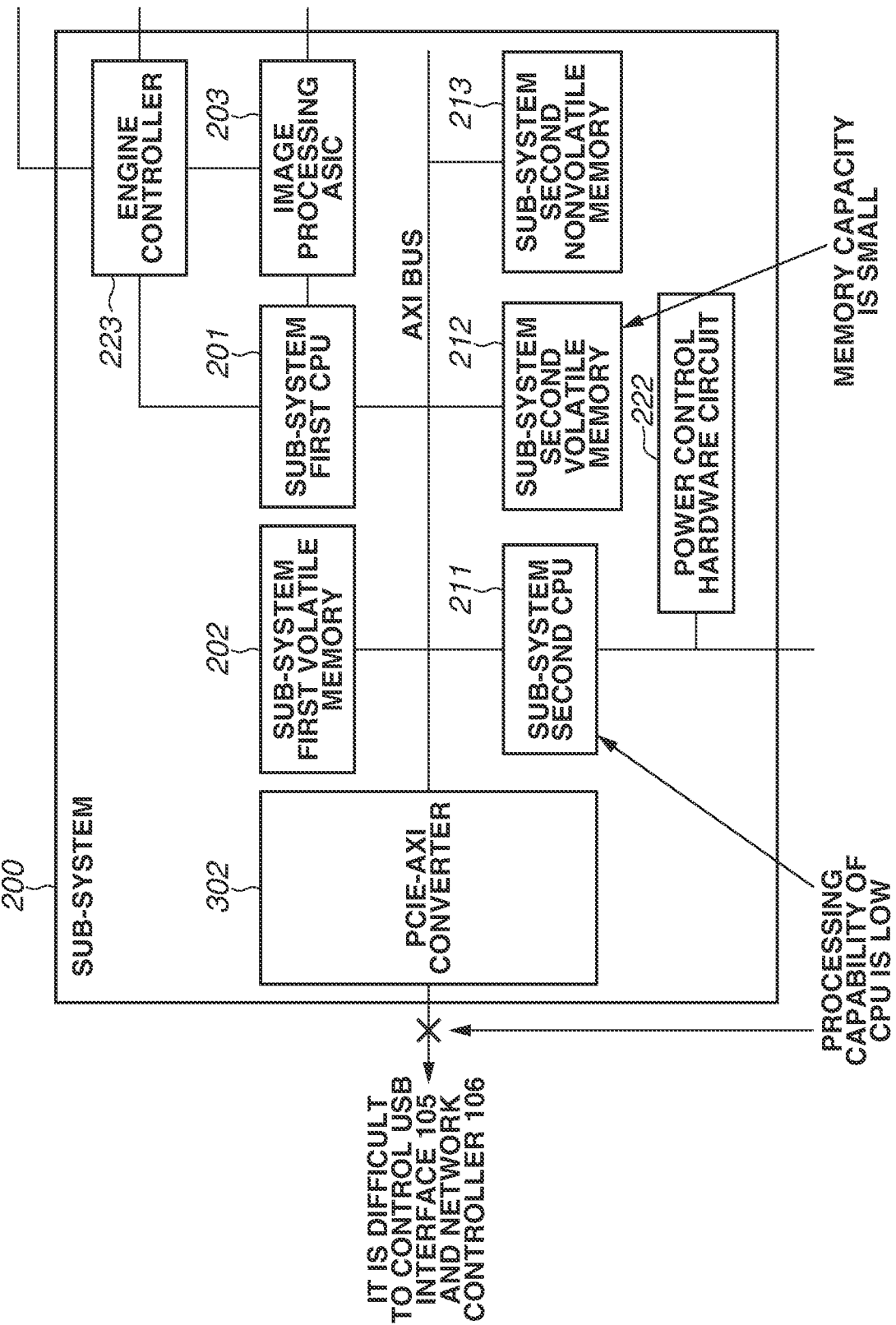
FIG. 4 is a diagram illustrating an example of a method of updating firmware.

The method of updating the firmware program of the CPU 211 according to a comparative example is described with reference to FIG. 4. To update the firmware of the CPU 211, the CPU 211 controls the USB interface 105 and the network controller 106 to acquire the update data for the firmware from the outside (external apparatus) of the image forming apparatus. The CPU 211 stores the update data in the volatile memory 212 that is a work memory for the CPU 211. The CPU 211 then updates the firmware stored in the nonvolatile memory 213 with the update data stored in the volatile memory 212.

As described above, in the comparative example, it is necessary for the CPU 211 to have processing capability to control the interface in order to acquire the update data from the outside and processing capability to update the firmware stored in the nonvolatile memory 213 at high speed. Further, it is necessary for the volatile memory 212 to have a sufficient memory capacity to store the update data in addition to the memory area to which the firmware of the CPU 211 before update is developed.

When the updating method according to the above-described comparative example is adopted, however, efficiency of the update may be deteriorated depending on the processing capability of the CPU 211 and the usable capacity of the volatile memory 212.

Therefore, in the present exemplary embodiment, the CPU 101 acquires the update data for the firmware of the CPU 211 from the outside, and updates the firmware stored in the nonvolatile memory 213 with the update data without going through the CPU 211 and the volatile memory 212. The method of updating the firmware according to the present exemplary embodiment is described with reference to FIG. 5.

Figure 5:
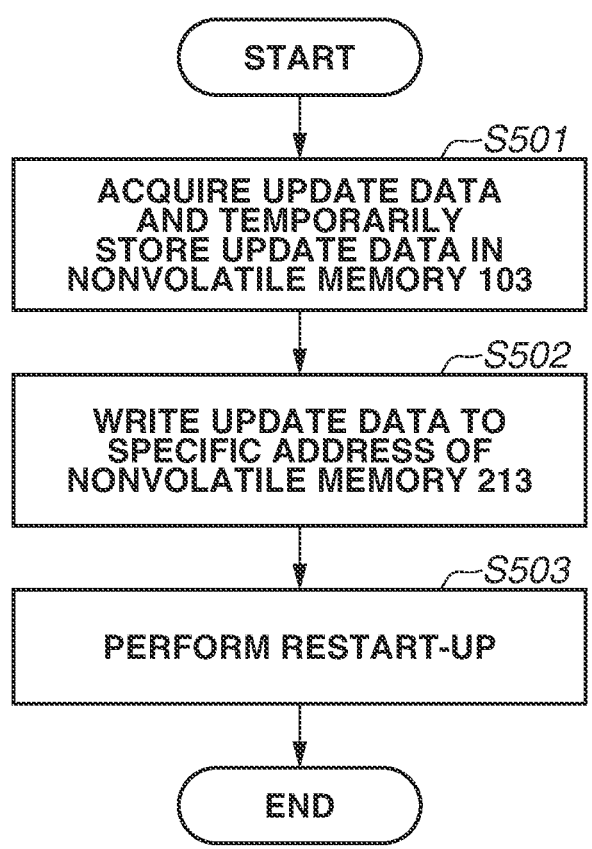
FIG. 5 is a diagram illustrating flow to update an operation program (firmware) of a sub-system second central processing unit (CPU) according to a first exemplary embodiment.

FIG. 5 illustrates flow of the processing executed by the CPU 101. The processing flow is flow of processing to update the firmware of the CPU 211, and the program to execute the processing flow (program to update firmware of CPU 211) is previously stored in the nonvolatile memory 103. When the CPU 101 detects that an operator of the image forming apparatus 1 instructs the operation unit 5 to execute the program to update the firmware of the CPU 211, the CPU 101 reads the program to update the firmware from the nonvolatile memory 103 to the volatile memory 102, and executes the program. Before the update processing flow is executed, the CPU 101 executes the processing in step S311 of FIG. 3 and the CPU 211 executes the processing in step S322 of FIG. 3 based on the firmware program before update. Therefore, the CPU 101 can access the nonvolatile memory 213 without going through the CPU 211 and the volatile memory 212. The update data for the firmware described below includes update data for the program that causes the CPU 211 to perform the data reading control and the data writing control of the storage device 6, update data for the program that causes the CPU 211 to perform the initial setting of the converter 302, and update data for the program that causes the CPU 211 to perform the power control.

In step S501, the CPU 101 controls the USB interface 105 to acquire the update data for the firmware of the CPU 211 from the USB memory 10, and temporarily stores the update data in the nonvolatile memory 103. As a result, even if the power of the image forming apparatus 1 is turned off due to unexpected power outage during the firmware update, it is possible to start the firmware update again with use of the update data still stored in the nonvolatile memory 103. In step S501, the CPU 101 may control the network controller 106 in place of the USB interface 105, to acquire the update data from the external apparatus through the LAN 8.

In step S502, the CPU 101 writes the update data stored in the nonvolatile memory 103, to the nonvolatile memory 213 of the sub-system 200 through the PCIe controller 301 and the converter 302.

More specifically, the CPU 101 issues an instruction to write the update data in the specific address of the nonvolatile memory 213 disposed in the PCIe space 512. The PCIe controller 301 then transfers the update data to the converter 302 through the PCIe bus, and the converter 302 overwrites the update data to the specific address of the nonvolatile memory 213 on the AXI bus based on the instruction. At this time, the converter 302 converts the bus access notified from the PCIe controller 301 into the bus access on the AXI bus based on the correspondence relationship set in step S322.

As described above, the update data is written to the nonvolatile memory 213 without going through the CPU 211 and the volatile memory 212.

In step S503, the CPU 101 restarts (reboots) the image forming apparatus 1 (main system 100 and sub-system 200) in order to reflect updated contents.

The above is the processing to update the firmware of the CPU 211 according to the present exemplary embodiment. The CPU 211 makes a setting of the converter 302 so that the CPU 101 acquiring the update data can access the nonvolatile memory 213 without going through the CPU 211 and the volatile memory 212. In other words, the CPU 211 makes the setting on the converter 302 such that the converter 302 receiving the update data writing instruction from the CPU 101 can directly write the update data to the nonvolatile memory 213 through the AXI bus. When the CPU 101 thereafter issues an instruction to write the update data in the nonvolatile memory 213 on the AXI bus, the converter 302 receives the instruction through the PCIe controller 301 and writes the update data to the nonvolatile memory 213 based on the instruction. As described above, the update data can be written without going through the CPU 211 and the nonvolatile memory 212.

Further, in the description according to the above-described exemplary embodiment, the converter 302 is included in the sub-system 200; however, the converter 302 may be disposed between the main system 100 and the sub-system 200. The main feature is writing of the update data into the nonvolatile memory 213 that stores the operation program to be executed by the CPU 211 making the setting of the converter 302, without going through the CPU 211 and the volatile memory 212.

A second exemplary embodiment is described below. In the above-described first exemplary embodiment, the CPU 101 can write the update data to the nonvolatile memory 213. The update data includes the operation program to perform the setting processing in step S322 of FIG. 3. Therefore, if unexpected situation such as power outage during update of the operation program and a cyber attack through the network occurs, the operation program in the nonvolatile memory 213 may be broken. As a result, the CPU 211 cannot perform correct setting on the converter 302 in step S322 in the start-up processing (FIG. 3) of the image forming apparatus 1, and the main system 100 and the sub-system 200 cannot communicate with each other at all. In such a situation, the defect is not eliminated even when the power of the image forming apparatus 1 is turned on again because the correct setting is not made in step S322.

Accordingly, in the present exemplary embodiment, the operation program relating to the processing in step S322 is excluded from the update target in the nonvolatile memory 213. Further, the main system 100 (CPU 101) does not refer to the memory block (storage area) in the nonvolatile memory 213 in which the operation program relating to the processing in step S322 is stored. The part not described in the present exemplary embodiment has a configuration similar to the first exemplary embodiment.

In the present exemplary embodiment, management of the nonvolatile memory 213 is performed in a divided state into two memory blocks. In other words, one of the memory blocks of the nonvolatile memory 213 is managed as a block in which the operation program to execute the setting processing in step S322 is stored, and the other memory block is managed as a block in which the operation program to execute the control processing in steps S323 and S324 is stored. The former memory block is managed as a nonvolatile memory first block 213-1, and the latter memory block is managed as a nonvolatile memory second block 213-2.

Figure 3:
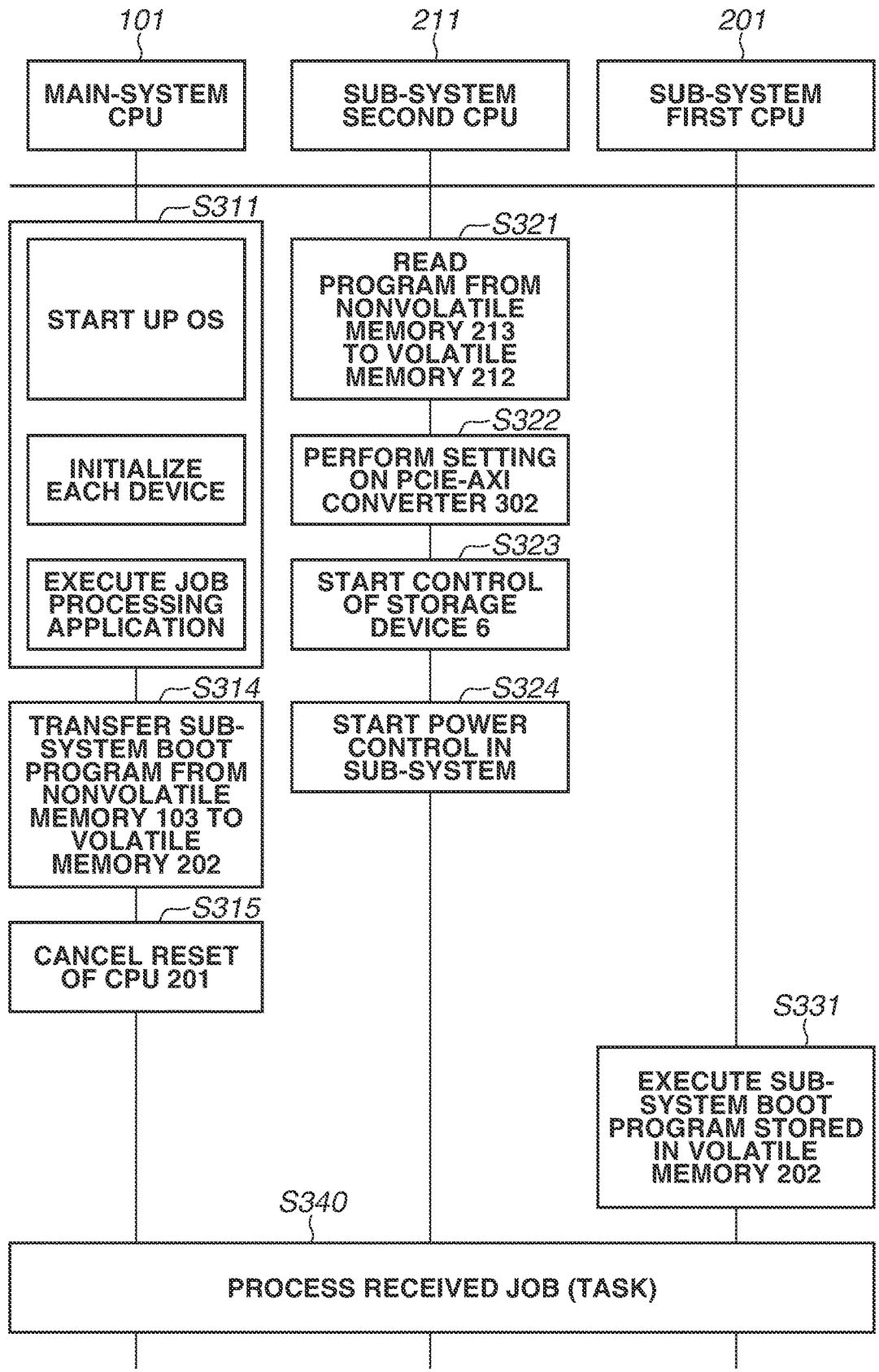
FIG. 3 is a diagram illustrating a start-up sequence by the controller.

In the start-up processing illustrated in FIG. 3, the CPU 101 makes the following setting in the initialization processing (initial setting) of the PCIe controller in step S311 (661 in FIG. 6). The CPU 101 makes the setting such that the CPU 101 cannot refer to the nonvolatile memory first block 213-1 but can refer to the nonvolatile memory second block 213-2. This is achievable by setting the PCIe space 512 described in FIG. 8 such that only the nonvolatile memory first block 213-1 cannot be used in the PCIe space 512.

Such a setting of the PCIe controller 301 is made in step S311, which makes impossible for the CPU 101 to write to the nonvolatile memory first block 213-1 (603 in FIG. 6). This makes it possible to prevent breakage of the operation program used in step S322. On the other hand, the CPU 211 makes a setting of the converter 302 in step S322 in a manner similar to the first exemplary embodiment (602 in FIG. 6), which enables the CPU 101 to write the update data to the nonvolatile memory second block 213-2. As a result, the CPU 101 can update the operation program used in steps S323 and S324 without going through the CPU 211 and the nonvolatile memory 212 (604 in FIG. 6). Further, in the present exemplary embodiment, in step S322, the CPU 211 makes the setting on the converter 302 such that the converter 302 cannot access the nonvolatile memory first block 213-1 (602 in FIG. 6).

A third exemplary embodiment is described below. In the present exemplary embodiment, data writing to the nonvolatile memory first block 213-1 is prevented by a method different from the method according to the second exemplary embodiment. The part not described in the present exemplary embodiment has a configuration similar to the second exemplary embodiment.

In the start-up processing illustrated in FIG. 3, the CPU 101 makes the following setting in the initialization processing (initial setting) of the PCIe controller in step S311 (701 in FIG. 7). The CPU 101 makes a setting such that the CPU 101 cannot refer to the nonvolatile memory first block 213-1 and the nonvolatile memory second block 213-2. This is achievable by setting the PCIe space 512 described in FIG. 8 such that only the nonvolatile memory 213 cannot be used in the PCIe space 512.

Further, in step S314, the CPU 101 transfers the update data to the volatile memory 202 in addition to the boot program to be used by the CPU 201 (704 in FIG. 7).

After execution of the processing in step S331, the CPU 201 writes the update data stored in the volatile memory 202, to the nonvolatile memory 213 through a memory controller unit 207 of the AXI bus (705 in FIG. 7). The memory controller unit 207 is configured not to write data to the nonvolatile memory first block 213-1 (706 in FIG. 7). In addition, the memory controller unit 207 is configured to write data to the nonvolatile memory second block 213-2 (707 in FIG. 7). Thus, the memory controller 207 controls access to the nonvolatile memory 213, which prevents data writing to the nonvolatile memory first block 213-1.

The sub-system first CPU 201 can access the storage device 6 and the power control hardware circuit 222 (707).

Also in the present exemplary embodiment, the CPU 101 may perform the following setting in the initialization processing (initial setting) of the PCIe controller in step S311 (701 and 703 in FIG. 7), as with the second exemplary embodiment. The CPU 101 makes a setting such that the CPU 101 cannot refer to the nonvolatile memory first block 213-1 but can refer to the nonvolatile memory second block 213-2. This is achievable by setting the PCIe space 512 described in FIG. 8 such that only the nonvolatile memory first block 213-1 cannot be used in the PCIe space 512. Also in the present exemplary embodiment, the CPU 211 may perform a setting on the converter 302 such that the converter 302 cannot access the nonvolatile memory first block 213-1, in step S322 (702 in FIG. 7).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-143943, filed Jul. 31, 2018, which is hereby incorporated by reference herein in its entirety.

What is claimed is:

1. An image forming apparatus, comprising:
a first system configured to communicate with the outside of the image forming apparatus, to notify a user of information, and to receive an instruction from the user; and
a second system connected to the first system and configured to control at least one of a printer device and a scanner device,
wherein the first system includes a first central processing unit (CPU) and a transfer device configured to transfer data from the first system to the second system,
wherein the second system includes a second CPU, a writing device configured to write the received data to a device of the second system, the device corresponding to an address designated as a writing destination of the data by the first CPU of the first system, and a nonvolatile memory configured to store firmware to be executed by the second CPU,
wherein the second CPU of the second system makes, on the writing device of the second system, a setting that enables the writing device to write the data received from the transfer device of the first system to the nonvolatile memory of the second system, and
wherein, after the second CPU of the second system makes the setting, the writing device of the second system receives update data for the firmware to be executed by the second CPU of the second system from the transfer device of the first system, and writes the received update data to the nonvolatile memory of the second system without going through the second CPU of the second system.

2. The image forming apparatus according to claim 1, wherein the writing device writes the update data for the firmware received from the transfer device to the nonvolatile memory storing the firmware to be executed by the second CPU, based on the setting made by the second CPU.

3. The image forming apparatus according to claim 1,
wherein the transfer device transfers the data, and the address designated as the writing destination of the data by the first CPU, from the first system to the second system, and
wherein the second CPU converts the address that has been designated by the first CPU and transferred from the transfer device, into an address in the second system, and makes, on the writing device, a setting that enables the writing device to write the data transferred from the transfer device, to a device corresponding to the address in the second system obtained through the conversion.

4. The image forming apparatus according to claim 3,
wherein the second system includes a bus connected to each of the second CPU, the nonvolatile memory, and the writing device, and
wherein the address in the second system is an address on the bus included in the second system.

5. The image forming apparatus according to claim 1, further comprising a nonvolatile storage device configured to store data,
wherein the firmware stored in the nonvolatile memory includes a program to cause the second CPU to make the setting, and a program to cause the second CPU to perform data writing control on the storage device, and
wherein the update data for the firmware includes update data for the program to cause the second CPU to perform the data writing control on the storage device.

6. The image forming apparatus according to claim 5,
wherein the nonvolatile memory includes a first storage area storing the program to cause the second CPU to make the setting, and a second storage area storing the program to cause the second CPU to perform the data writing control on the storage device, and
wherein the program to cause the second CPU to make the setting does not use the first storage area as a data writing target by the writing device.

7. The image forming apparatus according to claim 5, wherein the storage device is any of a plurality of storage devices including a hard disk drive and a solid-state drive.

8. The image forming apparatus according to claim 1, further comprising the printer device configured to print an image on a sheet,
wherein the second system includes an image processing device configured to perform image processing on the image to be printed by the printer device.

9. The image forming apparatus according to claim 8,
wherein the second system includes a third CPU configured to control the image processing device, and a volatile memory to which a boot program of the third CPU is loaded,
wherein the first system includes a nonvolatile memory configured to store the boot program of the third CPU,
wherein the second CPU also makes, in a process of the setting, the setting to enable the writing device to write the data received from the transfer device to the volatile memory of the second system, and
wherein the writing device subjected to the setting by the second CPU writes the boot program of the third CPU received from the transfer device, to the volatile memory for the third CPU to execute the boot program.

10. The image forming apparatus according to claim 1, wherein the first CPU makes, on the transfer device, a setting to refer to the second system.

11. The image forming apparatus according to claim 1, wherein the first system further includes a unit configured to acquire the update data for the second CPU to execute the firmware, from the outside of the image forming apparatus.

12. The image forming apparatus according to claim 1,
wherein the second system includes a volatile memory to which the firmware is loaded by the second CPU for the second CPU to execute the firmware, and
wherein the writing device writes the update data for the second CPU to execute the firmware, to the nonvolatile memory of the second system without going through the second CPU and the volatile memory to which the firmware is loaded.

* * * * *